(12) United States Patent
Zhang et al.

(10) Patent No.: US 6,366,266 B1
(45) Date of Patent: Apr. 2, 2002

(54) METHOD AND APPARATUS FOR PROGRAMMABLE FIELD EMISSION DISPLAY

(75) Inventors: Tianhong Zhang; Zhongi Xia, both of Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/388,671

(22) Filed: Sep. 2, 1999

(51) Int. Cl.$^7$ .............................. G09G 3/22; G09G 3/30
(52) U.S. Cl. ...................... 345/74.1; 345/75.2; 345/77; 345/78
(58) Field of Search .............................. 345/74.1, 75.2, 345/77, 78, 80, 81

(56) References Cited

U.S. PATENT DOCUMENTS

| | | | |
|---|---|---|---|
| 5,372,973 A | | 12/1994 | Doan et al. .................. 437/228 |
| 5,459,480 A | * | 10/1995 | Browing et al. ............... 345/75 |
| 5,894,293 A | | 4/1999 | Hush et al. .................... 345/74 |
| 5,909,200 A | * | 6/1999 | Hush ............................ 345/74 |
| 5,945,968 A | * | 8/1999 | Hush ............................ 345/74 |
| 6,009,015 A | * | 12/1999 | Sugiyama .............. 365/185.22 |
| 6,034,480 A | * | 3/2000 | Browing et al. .......... 315/169.1 |
| 6,097,359 A | * | 8/2000 | Known et al. ................ 345/74 |
| 6,181,308 B1 | * | 1/2001 | Cathey, Jr. et al. ......... 345/75.2 |

OTHER PUBLICATIONS

Ming–wha Chi and Albert Bergemont: Multi–level Flash/EPROM Memories: New Self–convergent Programming Method for Low–voltage Applications; 1995 pp. 271–274.5, 459,480.*

Institute of Electrical And Electronic Engineers, Inc.; Hot Carrier Self Convergent Programming Method for Multi–Level Flash Cell Memory; 1997; pp. 104–109; 35$^{th}$ Annual IEEE (1997) International Reliability Physics Symposium Proceedings.

(List continued on next page.)

*Primary Examiner*—Richard Hjerpe
*Assistant Examiner*—Duc Q Dinh
(74) *Attorney, Agent, or Firm*—Hugh R. Kress; Winstead Sechrest & Minick (57) ABSTRACT

A method and apparatus for programmable field emission display comprising an array of cathodoluminescent elements. Each cathodoluminescent element in the array is responsive to separate select signals to cause light to be emitted from said display at a location in the array corresponding to each separate cathodoluminescent element. In one embodiment, to account for processing variation and the like, each cathodoluminescent element is provided with a programmable element for adjusting the operating level of the associated cathodoluminescent element in response to select signals of predetermined voltage levels. Each programmable element includes a charge storage device and is initially programmed by storing a level of electric charge thereon such that uniformity of operation among the plurality of cathodoluminescent elements in the array is improved. In one embodiment the programmable element comprises a floating gate transistor. In another embodiment, each cathodoluminescent element is provided with an infrared-sensitive element for modulating the operating level of the corresponding cathodoluminescent element in relation to the intensity of infrared radiation to which the infrared-sensitive element is exposed, thereby enabling the field emission display to operate as an infrared radiation sensing and display device.

55 Claims, 7 Drawing Sheets

OTHER PUBLICATIONS

H.S. Kim, J.D. Choi, J. Kim, W.C. Shin, D.J. Kim, K.M. Mang, and S.T. Ahn; Fast Parallel Programming of Multi-Level NAND Flash Memory Cells Using the Booster–Line Technology; 1997; pp. 65–66; (1997) Symposium on VLSI Technology Digest of Technical Papers.

H. Gotou; An Experimental Confirmation of Automatic Threshold Voltage Convergence in a Flash Memory Using Alternating Word–Line Voltage Pulses; Oct., 1997; pp. 503–505; IEEE Electron Device Letters, vol. 18, No. 10.

DialogTech; DialogTech Titles List in Engineering & Electronics Research; 1997; 3 pages.

Min–hwa Chi and Albert Bergemont; Multi–level Flash/EPROM Memories: New Self–convergent Programming Method for Low–voltage Applications; 1995; pp. 271–274.

Walter F. Kosonocky; Review of Infrared Image Sensors with Schottky–Barrier Detectors; Oct. 22, 1991; pp. 173–203; Optoelectronics—Devices and Technologies, vol. 6, No. 22.

* cited by examiner

METHOD AND APPARATUS FOR PROGRAMMABLE FIELD EMISSION DISPLAY

FIELD OF THE INVENTION

The present invention relates to electronic display technology, and more particularly to programmable field emission displays which, in at least one embodiment may incorporate infrared light-sensitive elements.

BACKGROUND OF THE INVENTION

Field emission display ("FED") systems are well-known to those of ordinary skill in the art. FED technology represents one alternative means for providing relatively high-resolution displays for personal computers and the like, such as may also be provided by existing liquid crystal display ("LCD") technology.

Briefly characterized, present FED systems are most commonly implemented in the form of a plurality of discrete, selectively controllable cathodoluminescent devices arranged in an array so as to be able to present a viewable image comprising a plurality of individual picture elements ("pixels"). Known FED technology often utilizes semiconductor material (e.g., silicon) as a substrate to build active-matrix field emission displays ("AMFEDs"). An example of a known FED system is described in U.S. Pat. No. 5,894,293 to Hush et al., entitled "Field Emission Display Having Pulsed Capacitance Current Control."

Due to, among other factors, physical dimension and fabrication processing considerations, a recognized issue in the implementation of FEDs is that of uniformity among the many discrete cathodoluminescent devices making up a functional display. That is, those of ordinary skill will appreciate that one or more operational parameters of semiconductor devices, such as the conductivity of a FET transistor or the behavior of a cathodoluminescent emitter tip, for example, may vary from device to device or pixel-to-pixel as a result of practically unavoidable variations in such characteristics as the size, shape, doping concentrations, and so on, of each individual device. As will hereinafter be described in further detail, FEDs are typically made up of a large number—perhaps up to many hundreds of thousands or even millions—of cathodoluminescent structures each having one or more features as small as 50 Angstroms. Commercial-scale fabrication of such structures with acceptable physical and electronic uniformity among their number is a known engineering challenge.

A further aspect of FED technology of relevance to the present disclosure is the potential applicability of FED technology to the field of infrared radiation detection and imaging. Specifically, it has been proposed by one or more of the present inventors that infrared radiation-sensitive elements may be incorporated into FED systems to provide infrared detection and imaging capabilities. For example, it has been proposed to incorporate infrared-sensitive components into a FED system in order for such system to be responsive to impinging infrared radiation to display a graphical image reflecting the presence and intensity of the infrared radiation. Those of ordinary skill in the art will appreciate that such capabilities have potential application in, by way of example but not limitation, so-called "night-vision" equipment.

In embodiments of FED systems incorporating infrared-sensitive elements as proposed by the present inventors, an array of cathodoluminescent elements may be rendered responsive to the presence and intensity of impinging infrared radiation and thereby present a graphical image reflecting the infrared radiation.

Whereas conventional FED systems are susceptible to potentially unacceptable deficiencies relating to the problems of uniformity among the individual cathodoluminescent elements of which they are comprised, FED systems which additionally incorporate infrared-sensitive elements giving the systems additional capabilities and functionality are even more susceptible to uniformity problems. The additional infrared-sensitive elements are vulnerable to processing variation to an extent comparable to the elements comprising conventional FED systems. Moreover, the fabrication processes used to incorporate infrared-sensitive elements into a FED system can themselves worsen the problems with processing variations.

One proposed manner of addressing the problems of non-uniformity among a plurality of cathodoluminescent devices in a FED system involves providing external circuitry for adjusting, on a pixel-by-pixel basis, the voltage levels of the signals used to access each pixel. By adjusting the access voltage level individually for each pixel, the current through each cathodoluminescent element can be controlled. Non-uniformity in the performance among the plurality of cathodoluminescent devices can thus be compensated for with appropriate pixel-by-pixel adjustment.

In some cases, it may be undesirable to require external circuitry to compensate for non-uniformity in FED pixels. At the least, such circuitry is likely to increase the size, cost, complexity, and power consumption of a FED or a FED IR sensor. Furthermore, the digital signal processing overhead incurred by such circuitry can adversely impact the FED's performance.

SUMMARY OF THE INVENTION

In view of the foregoing and other considerations, the present invention relates to a method and apparatus for providing a field emission infrared detector/display system incorporating programmable elements facilitating the compensation for pixel-by-pixel variation in a displayed image. Such compensation is particularly desirably where such variation results from the dimensional and processing variations which can be expected to arise in the fabrication of large numbers of cathodoluminescent elements in a given FED system.

In one embodiment of the invention, at least one programmable element is provided in association with the circuitry corresponding to each pixel of a FED display. As a typically one-time operation performed as one of the final stages of manufacture of an FED system, the plurality of programmable elements are pre-set to compensate for detected variations in the operation of the individual cathodoluminescent elements comprising the overall FED system. Once the programmable elements are so pre-set, more uniform performance, on a pixel-to-pixel basis, may be achieved.

In another embodiment of the invention, the programmable elements associated with circuitry corresponding to each pixel of and FED display is further capable of compensating for pixel-to-pixel variation arising out of the introduction of infrared-sensitive elements in the FED system.

BRIEF DESCRIPTION OF THE DRAWINGS

The foregoing and other features and aspects of the subject invention will be best understood with reference to a detailed description of a specific embodiment of the invention, which follows, when read in conjunction with the accompanying drawings, in which.

DETAILED DESCRIPTION OF SPECIFIC EMBODIMENTS OF THE INVENTION

In the disclosure that follows, in the interest of clarity, not all features of actual implementations are described. It will of course be appreciated that in the development of any such actual implementation, as in any such project, numerous engineering and programming decisions must be made to achieve the developers' specific goals and subgoals (e.g., compliance with system- and business-related constraints), which will vary from one implementation to another. Moreover, attention will necessarily be paid to proper engineering and programming practices for the environment in question. It will be appreciated that such a development effort might be complex and time-consuming, but would nevertheless be a routine undertaking for those of ordinary skill in the field of field emission display technology.

Figure 5:
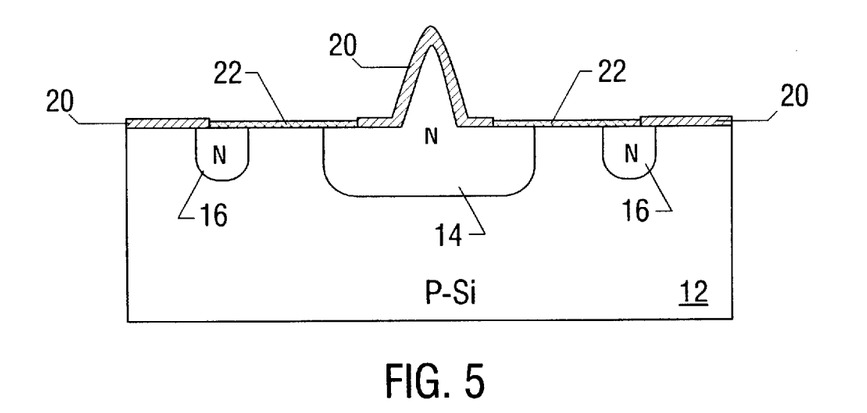
Figure 6:
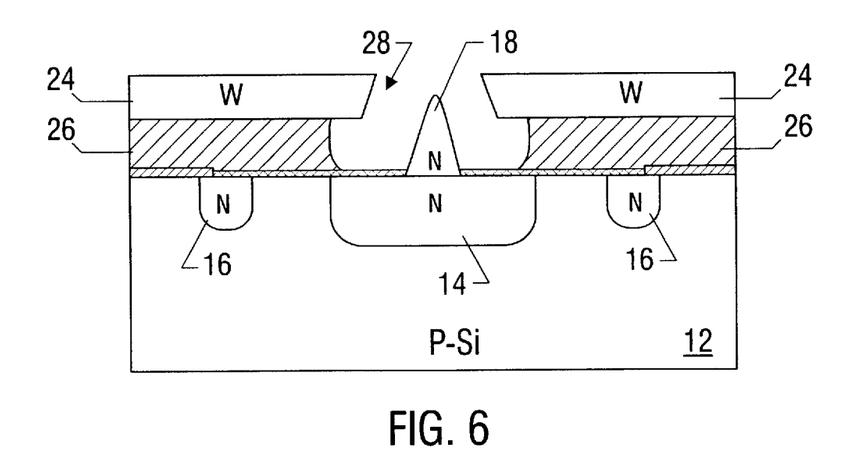
Figure 7:
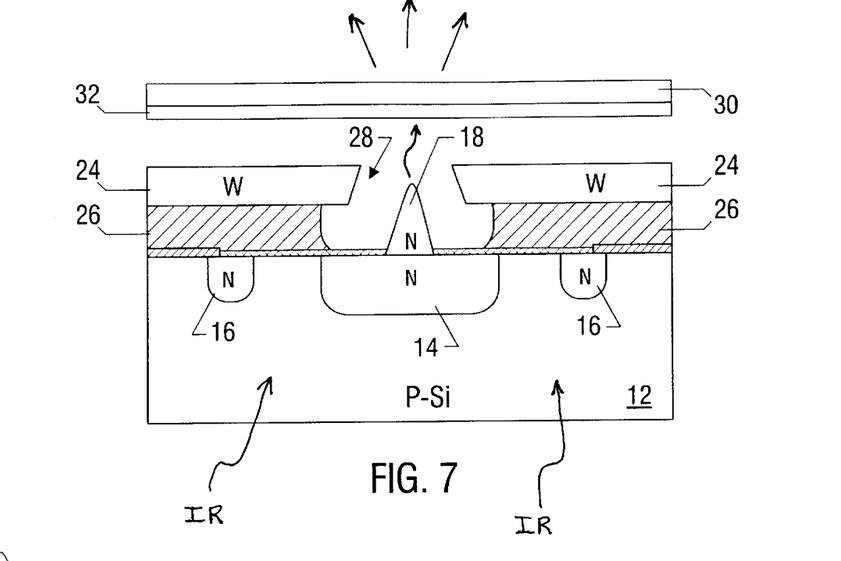
FIG. 7 is a cross-sectional view of a portion of a field emission display and infrared sensor in accordance with one embodiment of the invention, incorporating the cathodoluminescent element of FIGS. 1 through 6.

FIG. 7 is a cross-sectional view of a cathodoluminescent element 10 in accordance with one embodiment of the invention, with FIGS. 1 through 6 being cross-sectional views showing progressive stages in the process of fabricating device 10. It will be appreciated by those of ordinary skill in the art that element 10 is fabricated using standard semiconductor processing techniques. U.S. Pat. No. 5,372,973 to Trung Doan et al., entitled "Method to Form Self-Aligned Gate Structures Around Cold Cathode Emitter Tips Using Chemical Mechanical Polishing Technology," commonly assigned to the Assignee of the present invention, discloses one method of fabricating FED elements suitable for the purposes of the present invention. The Doan et al. '973 patent is hereby incorporated by reference herein it its entirety.

Figure 1:
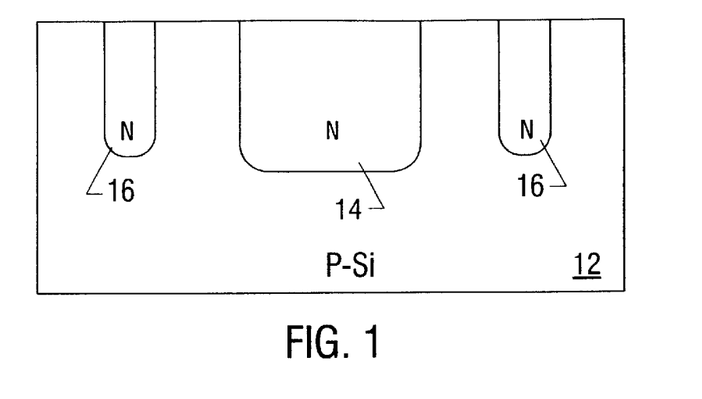
FIGS. 1 through 6 are cross-sectional views of a silicon substrate at successive times during the fabrication of a cathodoluminescent element in accordance with one embodiment of the invention.
Figure 2:
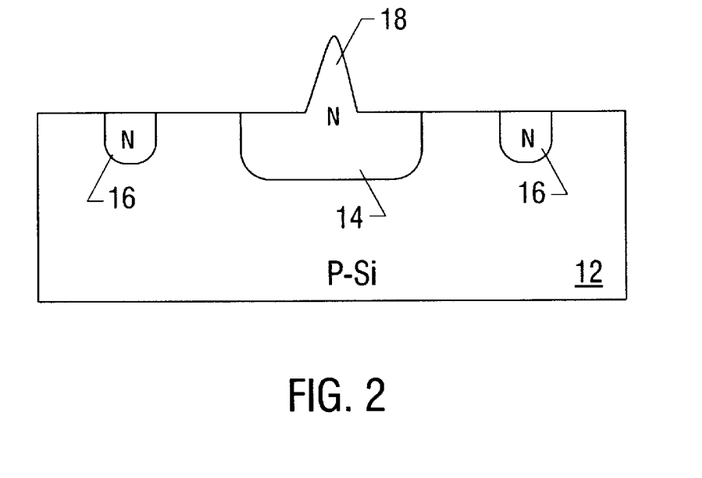

Fabrication of cathodoluminescent element 10 begins with a P-type silicon substrate 12 into which N-type implant regions 14 and 16 are formed. As shown in FIG. 2, the next step involves formation of an N-type silicon tip structure or emitter 18 atop N-type implant region 14. Those of ordinary skill in the art will appreciate that emitter 18 may be formed using well-known silicon etching techniques.

Figure 3:
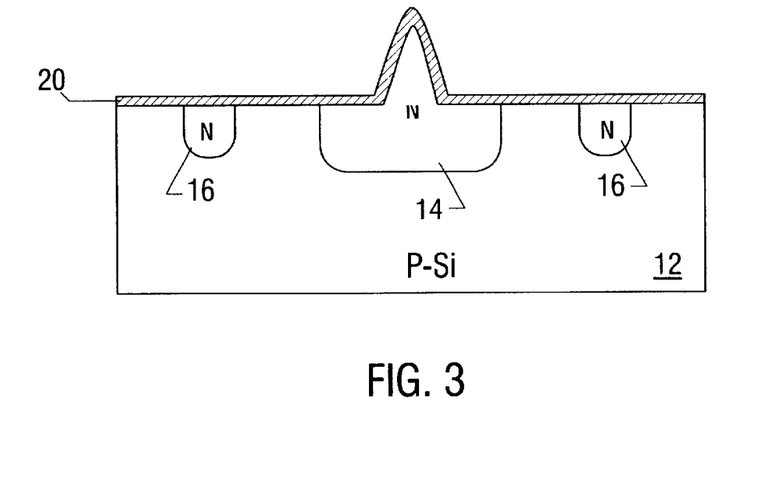
Figure 4:
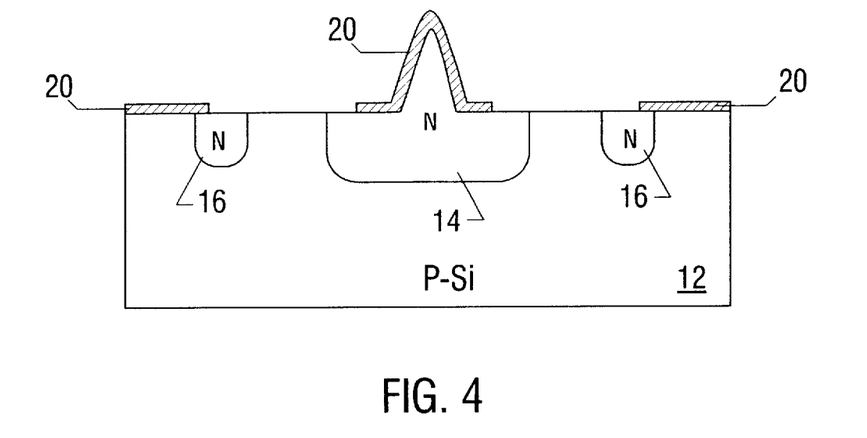

Next, as shown in FIG. 3, an oxidation step is performed to form an insulating silicon dioxide ($SiO_2$) layer 20. Portions of the $SiO_2$ layer 20 are then etched away to expose substrate 12, as shown in FIG. 4. In FIG. 5, it can be seen that a layer 22 of platinum silicide (PtSi) is applied in the areas where $SiO_2$ layer 20 is etched away. Those of ordinary skill in the art will appreciate that a junction between PtSi and p-type silicon is an infrared-sensitive structure; it is contemplated that other materials may be substituted for PtSi in accordance with the principles of the present invention, although PtSi is the presently preferred material. The effects of PtSi layer 22 on the operation of cathodoluminescent element 10 shall be hereinafter described in further detail.

The final fabrication stages involve the selective formation of a conductive layer 24 insulated from the remaining components of element 10 by a relatively thick oxide layer 26. This is shown in FIG. 6. Both conductive layer 24 and oxide layer 26 are formed so as define an aperture 28 to expose emitter 18 from above substrate 12. In the presently preferred embodiment, conductive layer 24 is tungsten, although it is contemplated that other conductive materials may be suitable for the purposes of the present invention.

Referring again to FIG. 7, cathodoluminescent element 10 cooperates with a display screen 30 mounted adjacent the substrate 12. In one embodiment, screen 30 is formed from a glass plate coated with a transparent conductive material to form an anode. A phosphor layer 32 covers the exposed surface of this anode. As will be hereinafter described in further detail, when a given cathodoluminescent element 10 is activated, electrons emitted from tip structure 18 are attracted to the anode and strike the phosphor layer 32, causing the phosphor layer 32 to emit light at the impact site. The emitted light then passes through screen 30 where it is visible to a viewer.

Those of ordinary skill the art will appreciate that a practical FED will incorporate many thousands of cathodoluminescent elements such as element 10 in FIG. 7. Typically, each picture element ("pixel") of a FED corresponds to one aperture 28 in conductive layer 24. Although only one emitter 18 is shown in element 10 of FIG. 7, this is solely for clarity in the present disclosure. It is to be understood that a plurality of tip structures 18 may be associated with each aperture 28, such a plurality of tip elements 18 being collectively referred to as an "emitter 18" or an "emitter set 18."

Regarding the size of cathodoluminescent element 10 and its various components, in the presently preferred embodiment each substantially conical emitter in emitter set 18 is on the order of 0.3 to 2 microns tall and has a diameter at its tip of approximately 50 to 300 Angstroms. Aperture 28 preferably has a diameter of approximately 0.2 to 1.0 microns.

As noted above, operation of cathodoluminescent element 10 involves emission of electrons from an emitter set 18. To induce such electron emission, conductive layer 24 is driven with a voltage of approximately 30–120 volts. The emitter set 18 may then be selectively activated by providing it with a current path to ground. The selective coupling allows electrons to be drawn from emitter set 18 by the grid voltage applied to conductive layer 24, assuming that the voltage differential between emitter set 18 and the conductive layer 24 is sufficiently high. The emitted electrons are attracted to the transparent anode layer applied to display screen 30.

The brightness of the light produced in response to the emitted electrons depends in part upon the rate at which electrons strike phosphor layer 32, which in turn depends upon the magnitude of current flow through tip structure 18. The brightness of each pixel can thus be controlled by controlling the current flow through emitters 18.

Figure 8:
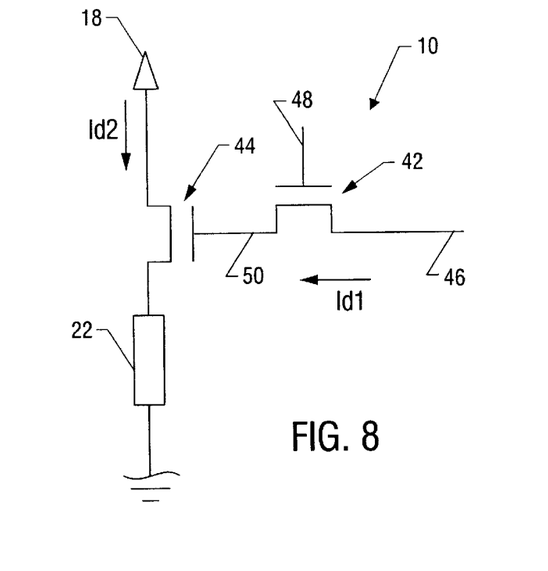
FIG. 8 is a schematic diagram of a prior art control circuit for a cathodoluminescent element.

FIG. 8 is a schematic diagram showing a conventional cathodoluminescent element control arrangement. Again, for clarity a cathodoluminescent element 10 comprising only a single emitter structure 18 is represented in FIG. 8, although in practical application a plurality of tip structures 18 comprising an emitter set would be provided for each pixel in the FED matrix. As shown in FIG. 8, associated with each emitter set 18 are two transistors 42 and 44, which cooperate selectively couple emitter set 18 to ground, enabling a current $I_{d2}$ to flow from emitter set 18 through transistor 44 to ground.

In particular, activation of element 10 involves assertion of a row select signal on the drain terminal 46 of transistor 42 and a column select signal on the gate terminal 48 of transistor 42. Application of the column select causes transistor 42 to turn on, enabling a current $I_{d1}$ to flow between the source and drain of transistor 42, and effectively couples the row select signal present at drain terminal 46 of transistor 42 to the gate terminal 50 of transistor 44. Application of the row select signal to the gate 50 of transistor 44, in turn, causes transistor 44 to turn on, thereby establishing a path for current $I_{d2}$ to ground. Those of ordinary skill in the art will appreciate, as noted above, that the magnitude of current $I_{d2}$ determines the rate of emission of electrons from emitter set 18.

FIG. 8 also shows schematically the presence of platinum silicide (PtSi) layer 22 in cathodoluminescent element 10. It is to be understood that PtSi layer 22 is only necessary in element 10 if it is desired to render the element sensitive to infrared radiation. In instances where infrared sensitivity is not desired, PtSi layer 22 may be omitted. Those of ordinary skill in the art will appreciate that in such implementations, element 22 in FIG. 8 would represent a simple ohmic resistance in the current path between emitter set 18 and ground.

Since PtSi is sensitive to infrared light (i.e., its conductivity is modulated based on the level of exposure to infrared radiation, sometimes referred to as thermal radiation), the magnitude of current $I_{d2}$ will be affected by the amount of infrared radiation to which element 10 is exposed. Accordingly, it has been shown by the inventors that element 10 can function not only as a device for displaying an image under control of row and column select voltages to terminals 46 and 48, but also as an infrared sensing element. That is, the intensity of electrons emitted from emitter set 18, and hence the intensity of light produced at phosphor layer 32, will reflect the intensity of infrared light to which element 10 is exposed.

Those of ordinary skill in the semiconductor art will appreciate that one or more operational parameters of transistors can vary as a result of process variations including variations in the size, shape, composition, doping concentrations and the like. The conductivity of a field-effect transistor (FET) in response to a voltage applied to its gate is one such operational parameter that is susceptible to process variation. That is, the respective conductivities of any two given FETs in response to a given gate voltage may differ as a result of process variation. This is sometimes expressed in terms of how "hard" a transistor turns on in response to a given gate voltage. In general, a higher gate voltage will tend to turn a transistor on to a greater extent, i.e., "harder," thereby effectively reducing the resistivity of the transistor and thereby increasing the amount of current conducted through the transistor. Processing variation, however, can lead to situations where two transistors—even two transistors fabricated at the same time on a single integrated circuit—do not turn on to the same degree and pass the same magnitude of current in response to the same gate voltage.

As noted above, to achieve a practically useful FED or infrared sensor, an array of a large number of elements 10 must be provided, along with corresponding control circuitry for activating individual ones of elements 10 in such array. Process variation such as described above, however, may exist and be manifested as non-uniformity in the operational response of individual elements 10 to applied control signals, and can be substantial enough to result in non-uniformity in the image ultimately displayed on display screen 30.

One method of addressing the uniformity problem involves compensating for process variation through careful adjustment of the voltage level of the column select signal applied to gate terminal 48 of transistors 42 each element 10 in an array. By controlling the gate voltage for transistor 42 for each element 10 in the array, the degree to which each transistor 42 is turned on can be adjusted. This results in adjustment of the magnitude of current $I_{d1}$ flowing between drain terminal 46 of transistor 42, which in turn results in adjustment of the degree to which transistor 44 turns on and hence the magnitude of current $I_{d2}$ conducted between emitter set 18 and ground potential.

A perceived drawback to the aforementioned method of improving uniformity among an array of cathodoluminescent elements 10 is the additional circuitry and processing overhead required by such an approach. For each pixel in the display, some amount of memory (e.g., eight to twelve bits) must be allocated for storing a unique digital value reflecting a desired voltage level for that pixel's column control signal. When it is desired to activate a given pixel, the memory must be accessed to get this pixel's voltage information. Selecting circuitry must then generate a column select voltage to be applied to the column select terminal 48 for that pixel, with the level of this voltage corresponding to the pixel data retrieved from memory. Those of ordinary skill in the art will appreciate that this processing overhead can be quite substantial for arrays which may contain many hundreds of thousands of elements 10 and which are required to operate at very fast refresh rates (i.e., each pixel being accessed and activated perhaps many times each second).

Figure 9:
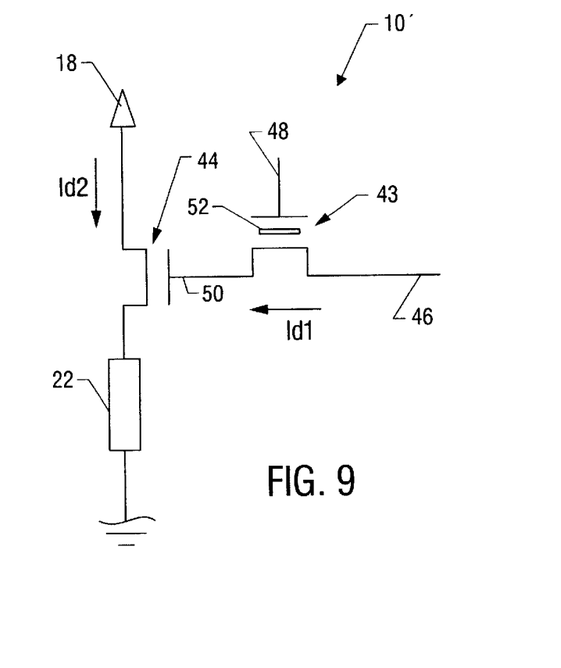
FIG. 9 is a schematic diagram of a control circuit for a cathodoluminescent element in accordance with one embodiment of the invention.

In accordance with a significant aspect of the present invention, therefore, a programmable element 43 is provided for each cathodoluminescent element 10, eliminating the need for peripheral memory and digital signal processing circuitry described above. Referring to FIG. 9, there is shown a cathodoluminescent element 10' in which a programmable element 43 is substituted for FET transistor 42 described with reference to FIG. 7. In one embodiment, and as is shown in FIG. 9, programmable element 43 is essentially a floating gate transistor, sometimes referred to as a flash memory cell, capable of being "programmed" or conditioned to retain a charge on its floating gate, which is designated with reference numeral 52 in FIG. 9.

In essence, as will hereinafter be described in further detail, programmable element 43 functions to derive a level-compensated voltage from the row select signal asserted on terminal 46 and apply this level-compensated voltage to the gate 50 of transistor 44. The amount of level-compensation performed by programmable element 43, in turn, is determined by the amount of charge stored on its floating gate 52, since the amount of charge stored on floating gate 52 alters the conductivity of the conductive path established between terminal 46 and gate 50 of transistor 44. By deriving the level-compensated voltage from the applied row select signal for each cathodoluminescent element 10', substantially uniform currents $I_{d2}$ can be achieved in all elements 10' from common row select and column select signal voltage levels despite process variations associated with transistors 44 which would otherwise lead to non-uniformity in their responses.

Those of ordinary skill in the art will appreciate that programmable element 43 is conventionally used for storage of binary digital data (where charge is either stored on floating gate 52 or is not). However, it has been shown in the prior art that such devices can be used for the purposes of storing analog data, where not merely the presence or absence of charge can be detected, but further where the level of stored charge can be detected when "reading" the cell. See, for example, Min-hwa Chi et al., "Multi-Level Flash/EPROM Memories: New Self-Convergent Programming Methods for Low-Voltage Applications," *IEEE IEDM*, 1995.

Operation of cathodoluminescent element 10' in accordance with the presently disclosed embodiment of the invention is as follows: First, programmable element must be "programmed" to store a desired voltage. The desired voltage is determined by conventional means, in which the response of the cell to application of row and column select signals is compared with the responses of other cells in an array. If, due to process variations, a given element 10' has a particularly high operating current $I_{d2}$ relative to other elements in an array, less charge may need to be stored on floating gate 52. On the other hand, if a given element has particularly low operating current $I_{d2}$ relative to others in the array, a larger charge may be stored on floating gate 52. In any event, the amount of charge stored on floating gate 52 alters the operational parameters of programmable element 43 in that it determines the conductivity of programmable element 43 and establishes a limit on the magnitude of operating current $I_{d2}$ flowing through programmable element 43 in response to given row select and column select voltage levels. Stated differently, the amount of charge stored on floating gate 52 determines the degree of level compensation performed by programmable element 43 on the row select signal before applying this level-compensated row select signal to the gate of transistor 44.

Programmable element 43 may be conditioned, i.e., programmed, in any conventional manner. In one embodiment, programming involves applying a constant (e.g., 5V) voltage to the drain terminal 46 of programmable element 43 while a sequence of one or more positive voltage pulses are applied to the gate terminal 48. Each pulse applied to the gate increases the level of charge stored on floating gate 52 by some incremental amount. Such a process is described, for example, in H Gotou, "An Experimental Confirmation of Automatic Threshold Voltage Convergence in a Flash Memory Using Alternating Word-Line Voltage Pulses," *IEEE Electron Device Letters*, vol. 18, no. 10, October 1997, pp. 503–505.

Figure 10:
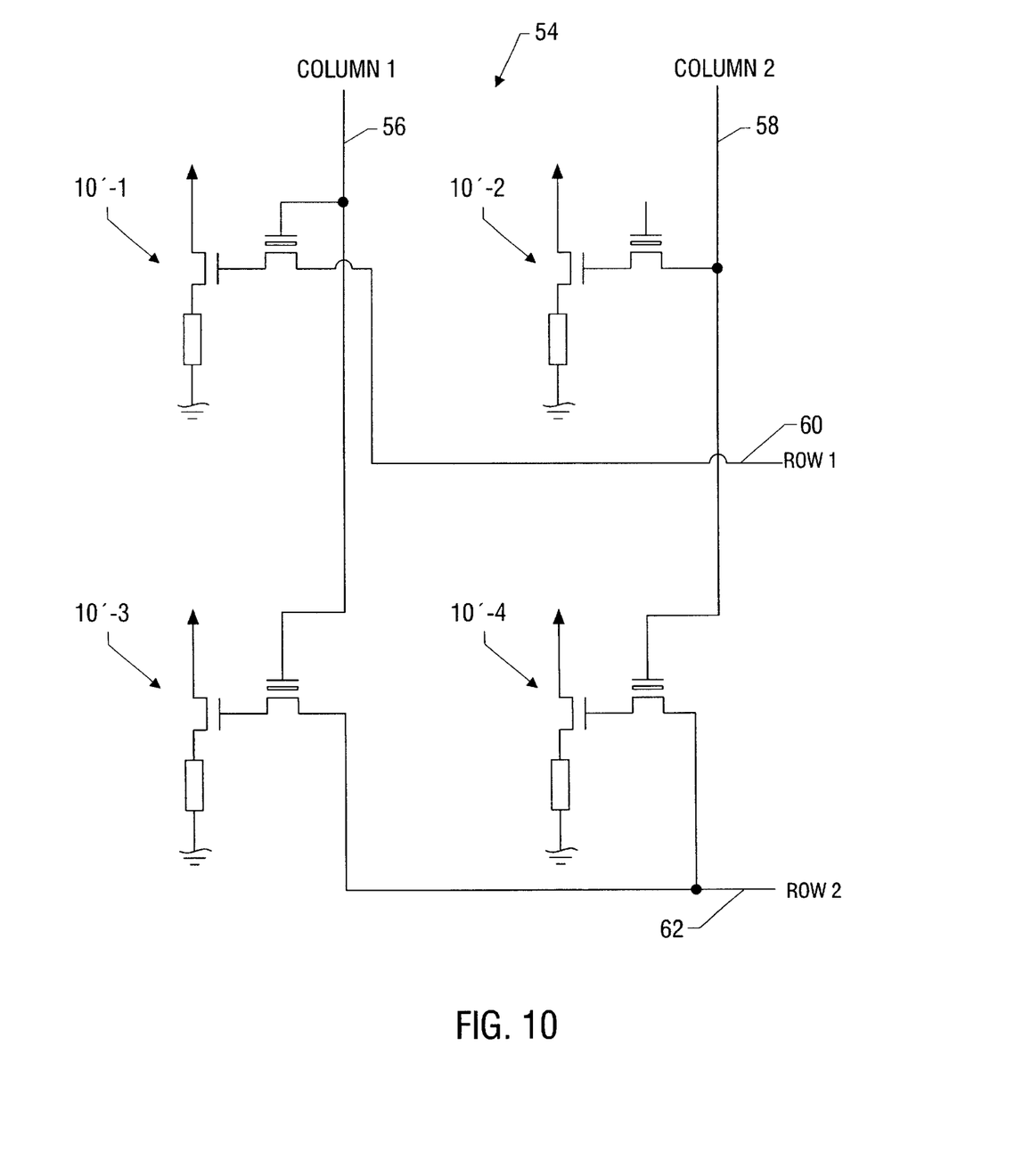
FIG. 10 is a schematic diagram of an array of cathodoluminescent elements in accordance with one embodiment of the invention.

FIG. 10 depicts a portion of a FED/infrared sensor array 54 in accordance with the presently disclosed embodiment of the invention. In particular, FIG. 10 shows four cathodoluminescent elements 10'-1, 10'-2, 10'-3, and 10'-4. Elements 10'-1 and 10'-3 are coupled to a common column select line 56; elements 10'-2 and 10'-4 are coupled to a common column select line 58. Similarly, elements 10'-1 and 10'-2 are coupled to a common row select line 60 while elements 10'-3 and 10'-4 are coupled to a common row select line 62.

Prior to operation as either a FED or an infrared sensor, each element 10' in array 54 must be calibrated so as to achieve uniformity in their respective responses to applied row and column select signals, as described above. As noted above, such calibration essentially involves comparing the responses of each element 10' to common select signals and storing unique voltages on the floating gate 52 of each element's programmable element 43 to reflect its performance relative to the others in the array.

In normal operation, each individual element 10' in array 54 is activated through assertion of the appropriate row and column select signals. For example, activation of element 10'-3 would entail assertion of row select signal 62 and column select signal 56, while row select line 60 and column select line 58 are held low (unasserted). Advantageously, in accordance with one aspect of the present invention, the voltage levels of row and column select signals may be the same for each element 10' in the array, and need not be custom-adjusted on an element-by-element basis. This is because the magnitude of current $I_{d2}$ through each programmable element, and hence indirectly the magnitude of current $I_{d1}$ through transistor 44, is determined by the amount of charge stored in each programmable element 43.

Turning now to FIGS. 11 through 18, there are shown cross-sectional views of a cathodoluminescent element 10' in accordance with the presently disclosed embodiment of the invention at various stages of the process of fabrication. It is to be understood that components shown in FIGS. 11 through 18 which are the same as those previously described with reference to FIGS. 1 through 7 have retained identical reference numerals.

Figure 11:
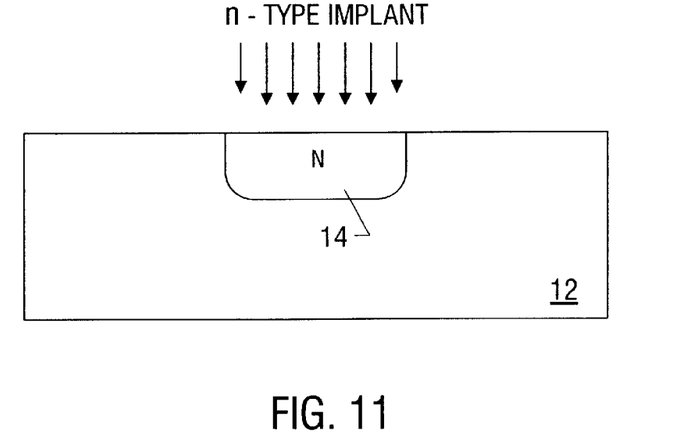
FIGS. 11 through 17 are cross-sectional view of a silicon substrate at successive times during the fabrication of a cathodoluminescent element in accordance with an alternative embodiment of the invention.
Figure 12:
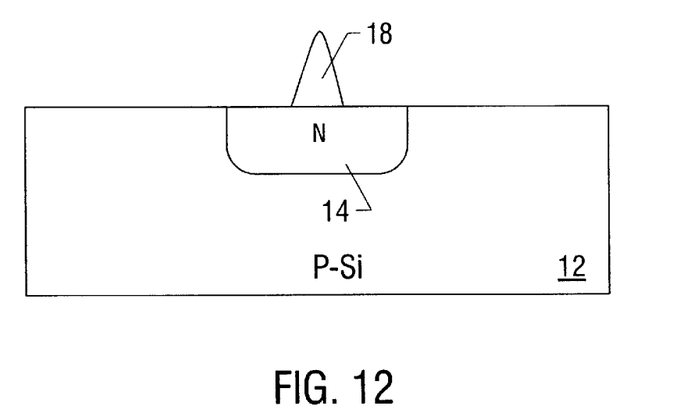
Figure 13:
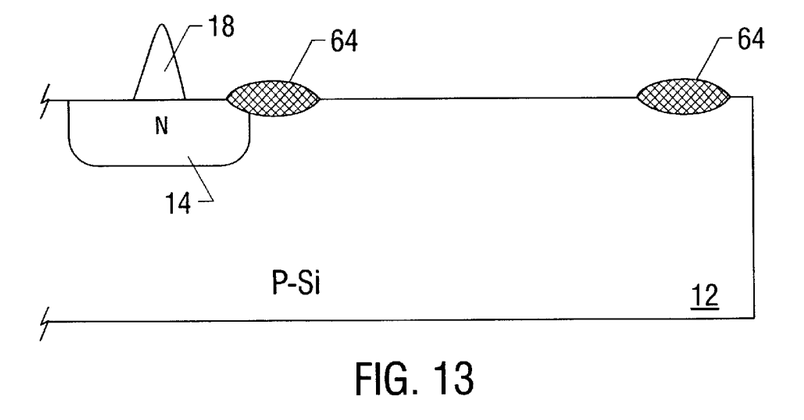
Figure 14:
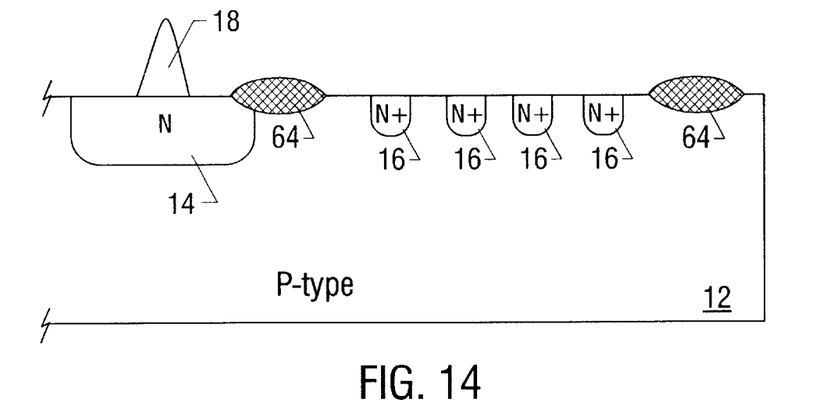

FIG. 11 shows the first stage of the fabrication process, in which an N-type region 14 is implanted in a P-type silicon substrate 12. FIG. 12 shows the device following formation of one or more substantially conical emitter structures 18 over N-type well 14. Next, as shown in FIG. 13, a pair of field-oxide elements 64 are formed, and as shown in FIG. 14, a plurality of N+ wells 16 are implanted. N+ wells 16 will form the source and drain regions for programmable elements 43 and transistors 44 in device 10'.

Figure 15:
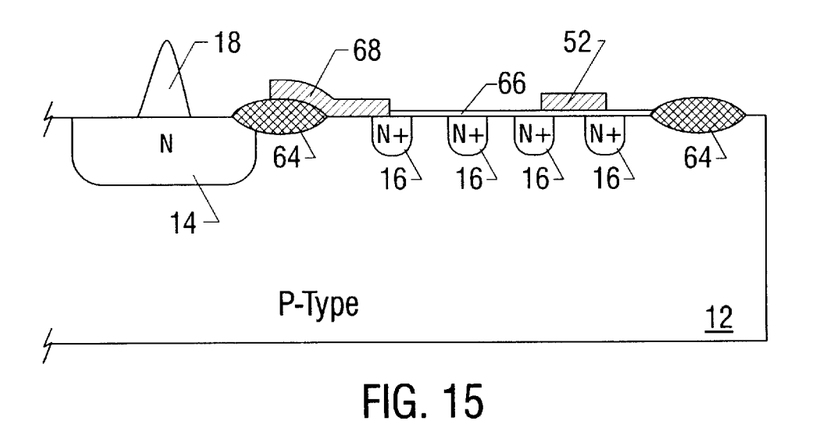

FIG. 15 shows a thin oxide layer 66 formed over the region including N+ wells 16. Additionally, FIG. 15 shows two polysilicon gates having been formed. A first of these polysilicon gates, designated with reference numeral 68 in FIG. 15, will become the gate of transistor 44 in device 10'. The second poly gate is designated with reference numeral 52 since it is the floating gate of programmable element 43, as previously discussed with reference to FIG. 9.

Figure 16:
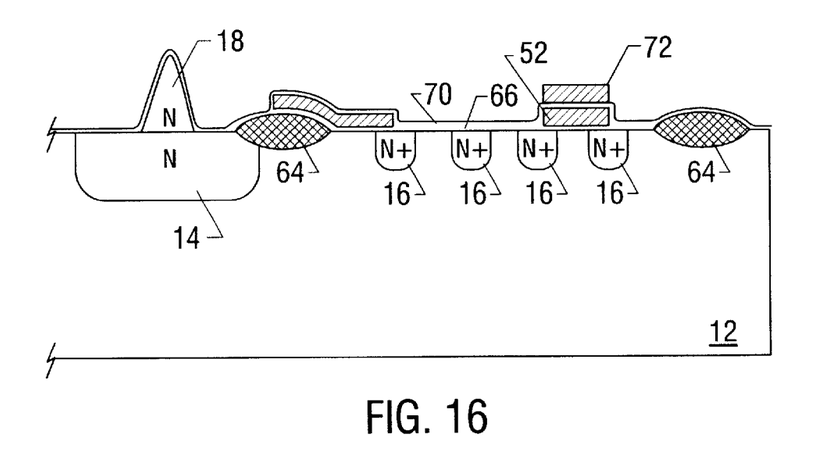
Figure 17:
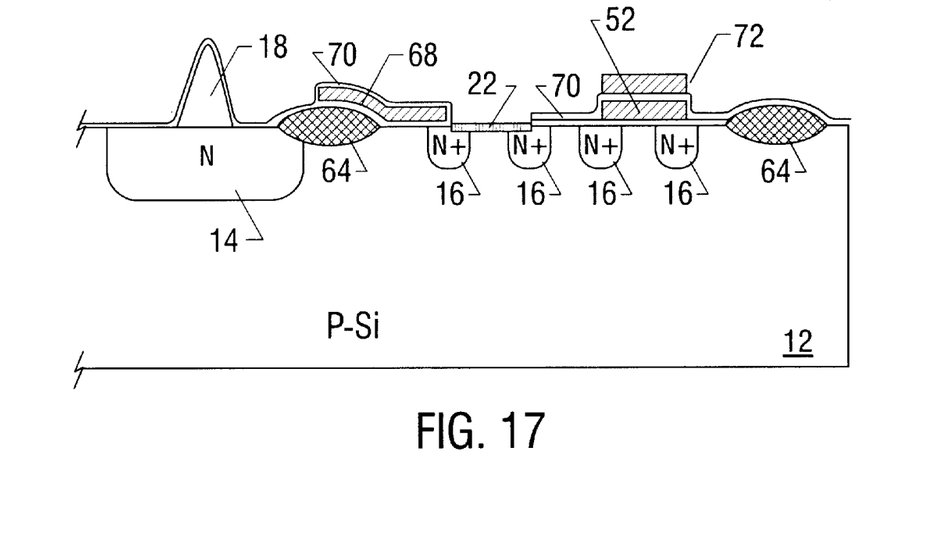

FIG. 16 shows another insulating oxide layer 70 formed over the entire device, with a polysilicon gate 72 formed above floating gate 52. Gate 72 is the true (as opposed to floating) gate of programmable element 43. As shown in FIG. 17, a portion of oxide layer 70 is etched away to permit deposition of a platinum silicide (PtSi) layer 22.

Those of ordinary skill in the art will appreciate that inclusion of PtSi layer 22 renders cathodoluminescent device 10' sensitive to exposure to infrared light, with the conductivity of the PtSi varying in response to application of infrared light. It is contemplated that in alternative embodiments of the invention, insofar as the invention relates to programmable elements 43, the PtSi may be omitted. Those of ordinary skill in the art will appreciate that in an embodiment not including PtSi element 22, there would be a simple ohmic path between transistor 44 and ground. Such an implementation would be appropriate in applications in which infrared sensitivity was not required.

Figure 18:
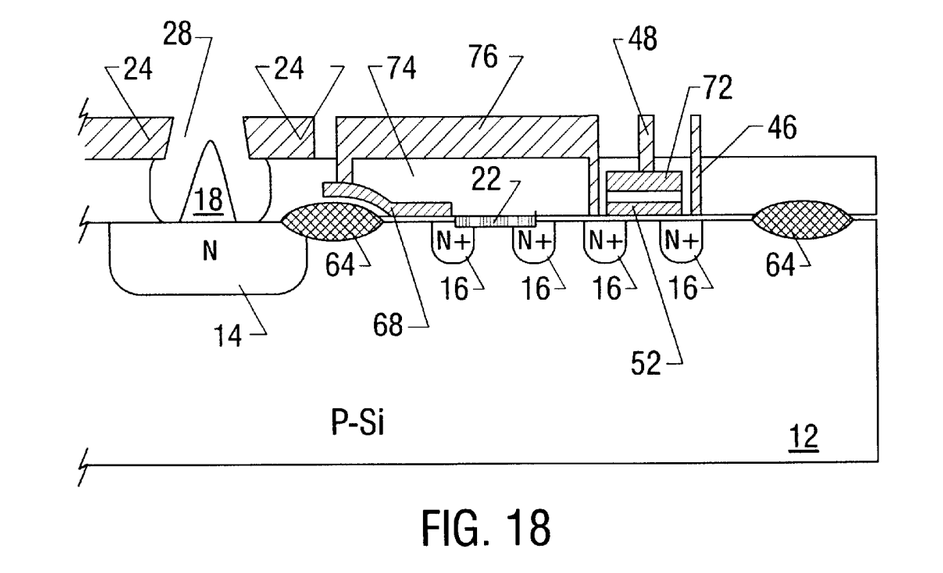
FIG. 18 is a cross-sectional view of the cathodoluminescent element fabricated using the steps of FIGS. 11 through 17.

FIG. 18 shows the final cross-sectional structure of element 10' in accordance with the presently disclosed embodiment of the invention. After PtSi element 22 is formed, a thick layer of oxide 74 is grown and selectively etched away to form aperture 28. Thereafter, a number of metal (e.g., tungsten) features are formed, including grid 24, a gate contact 76 for transistor 44, gate contact 48 for transistor 42', and a drain contact 46 for programmable element 43.

What is claimed:

1. A cathodoluminescent element comprising:
   at least one emitter;
   a first transistor having a first terminal coupled said at least one emitter, a second terminal coupled to a ground potential, and a gate terminal, said first transistor being responsive to a first voltage applied to said gate terminal to selectively establish a first conductive path for a first current between said at least one emitter and said ground potential;
   a programmable element having a first terminal coupled to a first select line to receive a first select signal, a second terminal coupled to said gate terminal of said transistor, and a gate terminal coupled to a second select line, said programmable element being responsive to assertion of a second select signal on said second select line to selectively establish a second conductive path for a second current between said first select line and said gate terminal of said transistor, thereby applying said first voltage to said gate terminal of said transistor;
   wherein said programmable element comprises a charge storage element for storing a level of electrical charge;
   and wherein the conductivity of said second conductive path varies in relation to said level of electrical charge such that the magnitude of said first voltage relative to the magnitude of said second select signal varies in relation to said level of electrical charge.

2. A cathodoluminescent element in accordance with claim 1, wherein said programmable element is a floating gate transistor.

3. A cathodoluminescent element in accordance with claim 1, further comprising an infrared-sensitive element disposed along said first current path, the conductivity of said infrared-sensitive element varying in relation to levels of exposure to infrared radiation such that the magnitude of said first current varies in relation to levels of exposure to infrared radiation.

4. A cathodoluminescent element in accordance with claim 3, wherein said infrared sensitive element comprises platinum silicide.

5. A cathodoluminescent element in accordance with claim 1, further comprising a conductive element proximal to said at least one emitter, said conductive element adapted to draw electrons from said at least one emitter when said transistor establishes said first conductive path.

6. A cathodoluminescent element in accordance with claim 5, further comprising an anode spaced apart from said conductive element, said anode adapted to attract said electrons drawn from said at least one emitter by said conductive element.

7. A cathodoluminescent element in accordance with claim 6, further comprising a phosphor layer applied to said anode, said phosphor layer being responsive to electrons attracted by said anode to emit light.

8. A cathodoluminescent element in accordance with claim 1, wherein said at least one emitter is disposed on a silicon substrate.

9. A cathodoluminescent element in accordance with claim 7, wherein the intensity of said light emitted from said phosphor layer varies in proportion to levels of infrared radiation to which said infrared sensitive element is exposed.

10. A field emission display, comprising an array of cathodoluminescent elements each comprising:
    at least one emitter;
    a first transistor having a first terminal coupled said at least one emitter, a second terminal coupled to a ground potential, and a gate terminal, said first transistor being responsive to a first voltage applied to said gate terminal to selectively establish a first conductive path for a first current between said at least one emitter and said ground potential;
    a programmable element having a first terminal coupled to a first select line to receive a first select signal, a second terminal coupled to said gate terminal of said transistor, and a gate terminal coupled to a second select line, said programmable element being responsive to assertion of a second select signal on said second select line to selectively establish a second conductive path for a second current between said first select line and said gate terminal of said transistor, thereby applying said first voltage to said gate terminal of said transistor;
    wherein said programmable element comprises a charge storage element for storing a level of electrical charge;
    and wherein the conductivity of said second conductive path varies in relation to said level of electrical charge such that the magnitude of said first voltage relative to the magnitude of said second select signal varies in relation to said level of electrical charge.

11. A field emission display in accordance with claim 10, wherein each said programmable element is a floating gate transistor.

12. A field emission display in accordance with claim 10, further comprising, for each cathodoluminescent element, an infrared-sensitive element disposed along said first current path, the conductivity of said infrared-sensitive element varying in relation to levels of exposure to infrared radiation such that the magnitude of said first current varies in relation to levels of exposure to infrared radiation.

13. A field emission display in accordance with claim 10, further comprising, for each cathodoluminescent element, a conductive element proximal to said at least one emitter, said conductive element adapted to draw electrons from said at least one emitter when said transistor establishes said first conductive path.

14. A field emission display in accordance with claim 13, further comprising an anode spaced apart from said array of cathodoluminescent elements, said anode adapted to attract said electrons drawn from each of said at least one emitter by respective ones of said conductive elements.

15. A field emission display in accordance with claim 14, further comprising a phosphor layer applied to said anode, said phosphor layer being responsive to electrons attracted by said anode to emit light.

16. A field emission display in accordance with claim 15, further comprising, for each cathodoluminescent element, an infrared-sensitive element disposed along said first current path, the conductivity of said infrared-sensitive element varying in relation to levels of exposure to infrared radiation to which it is exposed, such that the magnitude of said first current varies in relation to levels of exposure to infrared radiation to which said infrared-sensitive element is exposed, and such that the intensity of said light emitted by said phosphor layer varies in relation to levels of infrared radiation to which said infrared-sensitive element is exposed.

17. A field emission display in accordance with claim 10, wherein each of said at least one emitter is disposed on a silicon substrate.

18. A method of operating a cathodoluminescent element comprising an emitter selectively coupled to ground in response to application of a predetermined voltage to the gate of a transistor, said method comprising:

(a) conditioning a programmable element associated with said cathodoluminescent element to level compensate a first select signal to said predetermined voltage level in response to application of a second select signal to a gate terminal of said programmable element;

(b) applying said level-compensated first select signal to said gate of said transistor.

19. A method in accordance with claim 18, wherein said programmable element is a floating-gate transistor.

20. A method in accordance with claim 19, wherein said step (a) of conditioning comprises storing an electrical charge on the floating gate of said floating gate transistor.

21. A method in accordance with claim 20, further comprising:

(c) prior to said step (a) of conditioning said programmable element, applying said first select signal to said gate of said transistor without level compensation to cause electrons to be emitted from said emitter; and (d) determining a desired magnitude of said stored electrical charge based upon the intensity of electron emission from said emitter while said first select signal is applied to said gate of said transistor.

22. A method of operating a field emission display comprising an array of cathodoluminescent devices each comprising an emitter selectively coupled to ground in response to application of a predetermined voltage to the gate of a transistor, said method comprising:

(a) for each cathodoluminescent element in said array, conditioning an associated programmable element to level compensate a first select signal to said predetermined voltage level in response to application of a second select signal to a gate terminal of said programmable element;

(b) applying said level-compensated first select signal to said gate of said transistor in response to application of said second select signal to said gate terminal of said programmable element.

23. A method in accordance with claim 22, wherein said each programmable element is a floating-gate transistor.

24. A method in accordance with claim 23, wherein said step (a) of conditioning comprises storing an electrical charge on the floating gate of said floating gate transistor.

25. A method in accordance with claim 24, further comprising:

(c) for each cathodoluminescent element in said array, prior to said step (a) of conditioning said programmable element, applying said first select signal to said gate of said transistor without level compensation to cause electrons to be emitted from said emitter; and (d) for each cathodoluminescent element in said array, determining a desired magnitude of said stored electrical charge based upon the intensity of electron emission from said emitter while said first select signal is applied to said gate of said transistor.

26. A cathodoluminescent element, comprising:

at least one emitter;

a transistor coupled between said at least one emitter and a ground potential;

a programmable element having a first terminal coupled to said gate of said transistor, a second terminal adapted to receive a select signal having a predetermined voltage level, and a third terminal adapted to receive a control signal, wherein said programmable element is responsive to activation of said control signal to adjust said predetermined voltage level of said select signal by a preprogrammed amount and apply said adjusted select signal to a gate of said transistor;

and wherein said transistor is responsive to application of said adjusted select signal to said gate to couple said at least one emitter to said ground potential.

27. A cathodoluminescent element in accordance with claim 26, wherein said programmable element comprises a charge storage device for storing a level of electrical charge thereon.

28. A cathodoluminescent element in accordance with claim 27, wherein said preprogrammed amount is determined by said level of electrical charge.

29. A cathodoluminescent element in accordance with claim 28, wherein said charge storage device comprises a floating gate of a floating gate transistor.

30. A cathodoluminescent element in accordance with claim 26, further comprising a conductive element proximal to said at least one emitter, said conductive element adapted to draw electrons from said at least one emitter when said transistor couples said at least one emitter to ground.

31. A cathodoluminescent element in accordance with claim 30, further comprising an anode spaced apart from said conductive element, said anode adapted to attract said electrons drawn from said at least one emitter.

32. A cathodoluminescent element in accordance with claim 31, further comprising a phosphor layer applied to said anode, said phosphor layer being responsive to electrons attracted by said anode to emit light.

33. A cathodoluminescent element in accordance with claim 26, further comprising an infrared-sensitive element disposed between said transistor and said ground potential.

34. A cathodoluminescent element in accordance with claim 32, further comprising an infrared-sensitive element disposed between said transistor and said ground potential.

35. A cathodoluminescent element in accordance with claim 34, wherein the intensity of said light emitted by said anode varies in relation to levels of infrared radiation to which said infrared-sensitive element is exposed.

36. A cathodoluminescent element in accordance with claim 35, wherein said infrared-sensitive element is platinum silicide.

37. A field emission display, comprising an array of cathodoluminescent elements each comprising:

at least one emitter;

a transistor coupled between said at least one emitter and a ground potential;

a programmable element having a first terminal coupled to said gate of said transistor, a second terminal adapted to receive a select signal having a predetermined voltage level, and a third terminal adapted to receive a control signal, wherein said programmable element is responsive to activation of said control signal to adjust said predetermined voltage level of said select signal by a preprogrammed amount and apply said adjusted select signal to a gate of said transistor;

and wherein said transistor is responsive to application of said adjusted select signal to said gate to couple said at least one emitter to said ground potential.

38. A field emission display in accordance with claim 37, wherein said each programmable element comprises a charge storage device for storing a level of electrical charge thereon.

39. A field emission display in accordance with claim 38, wherein said each preprogrammed amount is determined by said level of electrical charge.

40. A field emission display in accordance with claim 39, wherein said charge storage devices comprise floating gates of respective floating gate transistors.

41. A field emission display in accordance with claim 37, further comprising, for each cathodoluminescent element, a conductive element proximal to said at least one emitter, said conductive element adapted to draw electrons from said at least one emitter when said transistor couples said at least one emitter to ground.

42. A field emission display in accordance with claim 41, further comprising, for each cathodoluminescent element, an anode spaced apart from said conductive element, said anode adapted to attract said electrons drawn from said at least one emitter.

43. A field emission display in accordance with claim 42, further comprising a phosphor layer applied to said anode, said phosphor layer being responsive to electrons attracted by said anode to emit light.

44. A field emission display in accordance with claim 37, further comprising, for each cathodoluminescent element, an infrared-sensitive element disposed between said transistor and said ground potential.

45. A field emission display in accordance with claim 43, further comprising, for each cathodoluminescent element, an infrared-sensitive element disposed between said transistor and said ground potential.

46. A field emission display in accordance with claim 45, wherein, for each cathodoluminescent element, the intensity of said light emitted by said anode varies in relation to levels of infrared radiation to which said infrared-sensitive element is exposed.

47. A field emission display in accordance with claim 46, wherein said infrared-sensitive element is platinum silicide.

48. A field emission display in accordance with claim 46, wherein said array of cathodoluminescent elements is adapted to present an image corresponding to infrared radiation levels to which said display is exposed.

49. A field emission display, comprising:

an array of cathodoluminescent elements each being responsive to a separate select signal to emit electrons toward an anode having a phosphor layer applied thereon, such that light is selectively emitted from said phosphor layer; and for each cathodoluminescent element in said array, a programmable element for determining a level of voltage adjustment to said separate select signal, such that said programmable element determines the intensity of light emitted from said phosphor layer.

50. A field emission display in accordance with claim 49, wherein for each cathodoluminescent element, said programmable element comprises a charge storage device for storing a level of electrical charge thereon.

51. A field emission display in accordance with claim 50, wherein for each cathodoluminescent element, said charge storage device comprises a floating gate of a floating gate transistor.

52. A field emission display in accordance with claim 51, further comprising, for each cathodoluminescent element, an infrared-sensitive element for modulating said intensity of light emitted by said phosphor layer in proportion to levels of infrared radiation to which said each cathodoluminescent element is exposed.

53. A method of operating a field emission display comprising an array of cathodoluminescent elements each having a programmable element associated therewith and each responsive to a separate select signal having a predetermined voltage level to cause light to be emitted from said display at a respective location in said array corresponding to said each cathodoluminescent element, comprising:

(a) separately for each cathodoluminescent element is said array, pre-programming said programmable element to specify the intensity of light emitted by said display at said respective location in said array corresponding to said each cathodoluminescent element in response to application of said separate select signal corresponding to said each cathodoluminescent element.

54. A method in accordance with claim 53, wherein for each said cathodoluminescent element in said array, said step of pre-programming comprises storing a desired level of electric charge on a charge storage device.

55. A method in accordance with claim 54, wherein said step of storing a desired level of electric charge comprises storing said desired level of electric charge on a floating gate of a floating gate transistor.

\* \* \* \* \*